United States Patent [19]

Haragushi

[11] 4,162,837

[45] Jul. 31, 1979

[54] MOTOR DRIVE DEVICE FOR CAMERA

[75] Inventor: Keisuke Haragushi, Ranzan, Japan

[73] Assignee: Asahi Kogaku Kogyo Kabushiki Kaisha, Tokyo, Japan

[21] Appl. No.: 831,319

[22] Filed: Sep. 7, 1977

[30] Foreign Application Priority Data

Sep. 7, 1976 [JP] Japan .................. 51-106913

[51] Int. Cl.² .................................. G03B 1/18
[52] U.S. Cl. ..................... 354/173; 354/170; 354/204
[58] Field of Search ............. 354/170, 171, 173, 204

[56] References Cited

U.S. PATENT DOCUMENTS 3,913,114  10/1975  Taguchi et al. ............... 354/173
3,994,003  11/1976  Iwashita et al. .............. 354/173

Primary Examiner—Russell E. Adams
Attorney, Agent, or Firm—Sughrue, Rothwell, Mion, Zinn and Macpeak

[57] ABSTRACT

A motor drive device for a camera includes a planetary gear mechanism having a sun gear coupled to the driving side and a planet gear adapted to revolve around the sun gear in mesh with an internal gear coupled to the driven side. The revolution of the planet gear is interrupted at the time of film winding so that the planet gear serves as a relay gear between the driving side and the driven side. Once winding is completed, the planet gear begins revolving around the sun gear. The entire mechanism is stopped so that shutter release may be effected. When shutter release has been effected, the planet gear again revolves around the sun gear to the point where the revolution of the planet gear is again interrupted for film winding.

6 Claims, 5 Drawing Figures

MOTOR DRIVE DEVICE FOR CAMERA

SUMMARY OF THE INVENTION

This invention relates to a motor drive device for a camera by the application of differential gears including a planet gear. The motor drive device according to the present invention is characterized in that a sun gear is coupled to the driving side and the planet gear revolves around the sun gear in mesh with an internal gear coupled to the driven side. The revolution of the planet gear around the sun gear is interrupted at the time of the film winding so that the planet gear serves as a relay gear, thereby transmitting the drive force of a motor to a film winding interconnecting portion. The motor drive device according to the invention is further characterized in that the rotation of the gears on the driven side, including the internal gear, is stopped at the time of the shutter release so that the revolution of the planet gear around the sun gear is permitted independently of the film-winding interconnecting portion, whereby the shutter release may be effected. It is thus an object of the present invention to provide a motor drive device for a camera, wherein the revolution of a planet gear around a sun gear is controlled by a mechanism simple in construction, and a reduction in size as well as weight of a camera is achieved.

BRIEF DESCRIPTION OF THE DRAWINGS

The above object and other features of the present invention will be apparent from the ensuing part of the specification in conjunction with the drawings, in which.

DETAILED DESCRIPTION OF THE INVENTION

Figure 1:
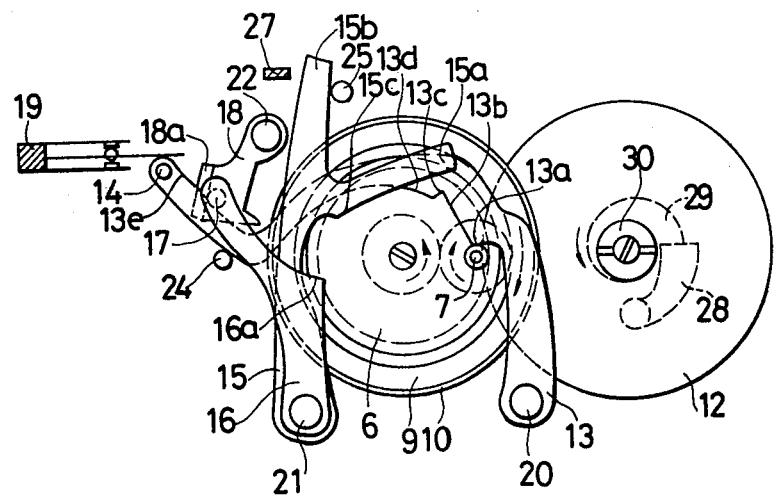
FIG. 1 is a top plan view of a motor drive device according to a preferred embodiment of the present invention, showing the condition in which a film is being wound.
Figure 2:
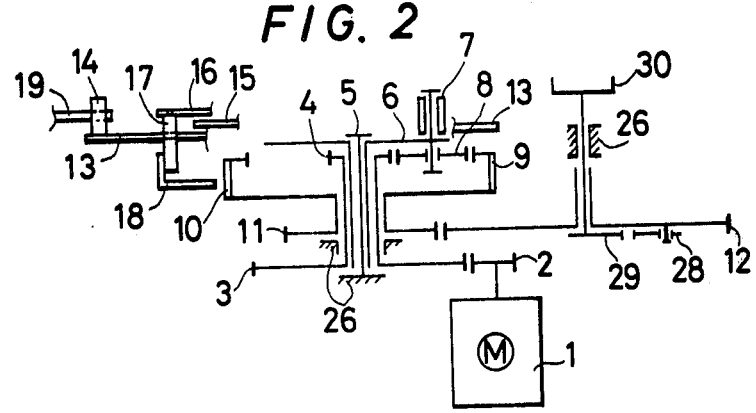
FIG. 2 is a diagrammatical longitudinal cross sectional view of the device.

Referring first to FIGS. 1 and 2, a drive force of a motor 1 is transmitted by way of a motor gear 2 and a reduction gear 3 to a sun gear 4. A roller 7 is rotatably mounted on a shaft on a disc 6 which in turn is rotatably mounted on a shaft 5. A lock lever 13 is rotatably mounted on a shaft 20 rigidly secured to a camera body 26 and given a tendency of being rotated in the counterclockwise direction under the force of a spring (not shown), the lock lever having a jaw portion 13a. When roller 7 is locked by the jaw portion 13a with the lock lever 13 maintained stopped through the engagement with a stopper 24, planet gear 8 journaled on the shaft on the disc 6 serves as a relay gear, thereby transmitting the drive force of motor 1 to an internal gear 9, i.e., a gear having gear teeth facing radially inwardly. This drive force is transmitted by way of a gear 11 integral with the internal gear 9 to a film winding gear 12. A release lever 15 is rotatably mounted on a shaft 21 rigidly secured to the camera body 26 and given a tendency of being rotated in the clockwise direction under the action of a spring (not shown). The lever 15 has forked arms 15b and 15a. In FIG. 1, release lever 15 is shown in a locked state by a stopper 25, with its one arm 15b positioned engageably with a release device 27 provided in the camera body and with the other arm 15a crossing the locus of the revolution of roller 7 around the sun gear 4 on the disc 6. A lever 16 interconnected with a locking pawl 18 is rotatably mounted on the shaft 21 and has a tendency of being rotated in the counterclockwise direction under the force of a spring (not shown). Lever 16 has a pin 17 thereon which is adapted to engage a surface of lock lever 13, to thereby stop the rotation in the counterclockwise direction of lever 16, as shown in FIG. 1. Pin 17 also engages an upright bent portion 18a of locking pawl 18, thereby interrupting the rotation in the counterclockwise direction of locking pawl 18, which is rotatably mounted on a shaft 22 and given a tendency of being rotated in that direction under the force of a spring (not shown). Interconnecting lever 16 has an angular portion 16a which is adapted to cross the locus of the revolution of the roller 7 around the sun gear 4, when urged in the clockwise direction by lock lever 13. Locking pawl 18 is adapted to engage a circumferential tooth 10 of internal gear 9, when the pawl disengages from pin 17 of lever 16. A switch 19 is changed over from one terminal to the other by a pin 14 provided on lock lever 13. Mounted under film winding gear 12 are unidirectional clutches 28 and 29 through which a drive force is to be transmitted to a coupling portion 30 on the motor drive side when these separate clutches are actuated in the counterclockwise direction.

Figure 3:
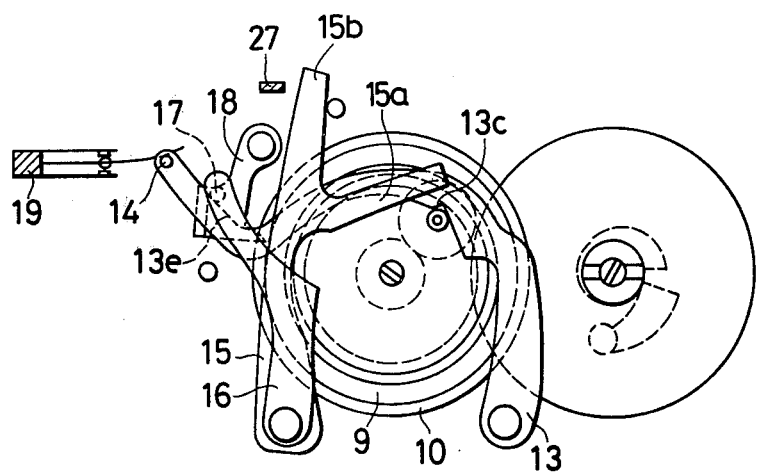
FIG. 3 is a top plan view of the device, showing the termination of winding of a film.

In operation, the film winding operation is conducted when roller 7 is locked by jaw portion 13a of lock lever 13, as described in the foregoing. At this time, planet gear 8 merely serves as a relay gear so that the drive force of the motor 1 is transmitted from the sun gear 4 and planet gear 8 by way of internal gear 9 and reduction gear 11 to film winding gear 12, during which time the film is wound by the portion 30 coupled to the camera by way of unidirectional clutches 28 and 29 (FIG. 1). Upon termination of the winding of the film in the camera, the rotation of the members associated with the camera body is interrupted with the result that film winding gear 12, reduction gear 11 and internal gear 9 are all stopped. As a result, the drive force of the motor 1 is exerted on the engaging portion of the roller 7 relative to the jaw portion 13a of lock lever 13 which is maintained locked due to the biasing spring force. Roller 7 is thus only elastically locked, so that the revolution of planet gear 8 around the sun gear 4 is permitted. The revolution of planet gear 8 around sun gear 4 causes roller 7 on disc 6 to ride over the jaw portion 13a of lock lever 13, and then roller 7 rolls down along cam surface 13b of lock lever 13 into a shoulder portion 13c. Simultaneously with the riding of the roller 7 over the jaw portion 13a, the movable contact of switch 19 is changed over from one terminal to the other by pin 14 through the rotation in the clockwise direction of lock lever 13, thereby stopping the motor 1. The switch 19 is then retained in that position. The rotation in the clockwise direction of lever 13 causes pin 17 to move in the clockwise direction by way of cam surface 13e of lock lever 13, whereby locking pawl 18 is released from the locked condition and in turn comes into engagement with a circumferential tooth 10 of internal gear 9. On the other hand, when roller 7 rolls down along the cam surface 13b after passing over the jaw portion 13a of the lock lever, a revolving force acts on the shaft of roller 7 by the combination of the slope of lock lever 13, spring force and inertia produced when the roller rides over the jaw portion, so that the revolution of planet gear 8 around sun gear 4 is stopped. The planet gear 8 then revolves on its axis in the counterclockwise direction thereby reversing the rotation of internal gear 9, whereby the load exerted on the camera body is removed. This condition is shown in FIG. 3.

Figure 5:
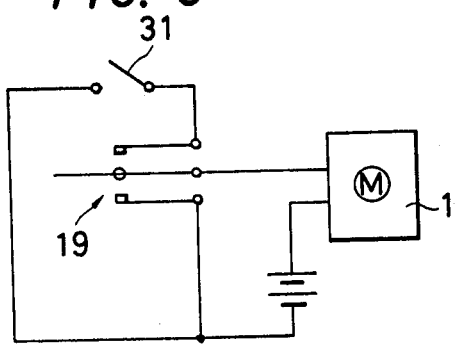
FIG. 5 is a simplified schematic diagram illustrating the principle of operation of the motor control circuitry.
Figure 4:
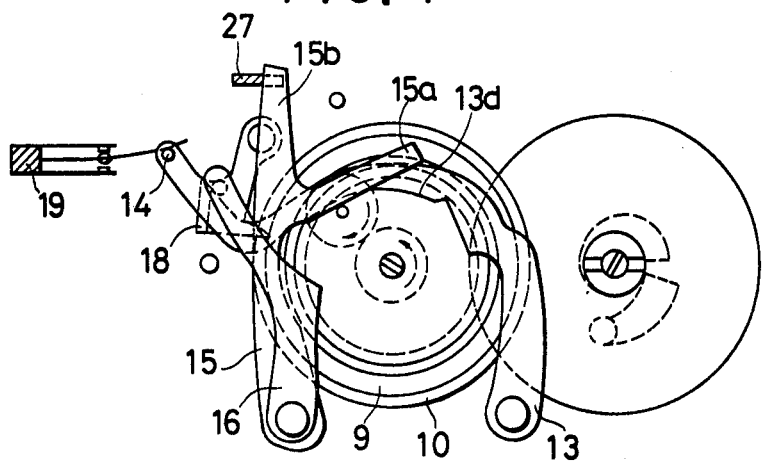
FIG. 4 is a top plan view showing the condition in which a shutter is being released.

In the shutter releasing operation, when the motor is driven by a known release signal from a switch 31 (FIG. 5), the rotation in the clockwise direction of internal gear 9 is stopped because of the locking pawl 18 engaging a circumferential tooth 10 of internal gear 9, and planet gear 8 in turn starts revolving around sun gear 4, while revolving on its axis in the clockwise direction. Roller 7 on disc 6 engages arm 15a of release lever 15, thereby urging the release lever 15 in the counterclockwise direction, whereby release device 27 on the camera body side is moved leftwards and causes the shutter release to be effected by a release mechanism provided in the camera body (not shown). This condition is shown in FIG. 4. At this stage, switch 19 is maintained in contact with the upper terminal as shown in FIG. 4 by the action of roller 7 against cam surface 13d of lock lever 13. When roller 7 rolls down along the arm edge 15c of release lever 15, a revolving force acts on the roller shaft by the combination of the spring force of release lever 15 and the return spring force of lock lever 13 in a manner similar to that in the film winding operation. At the same time, switch 19 is changed over from the upper terminal to the lower terminal. The change over of switch 19 permits switch 31 to again be opened without stopping motor 1 as may be appreciated from FIG. 5. The planet gear 8 then revolves on its axis in the counterclockwise direction thereby rotating internal gear 9 in the reverse direction (in the counterclockwise direction). The roller 7 in turn engages the angular portion 16a of locking-pawl-interconnecting lever 16, thereby urging the interconnecting lever 16 in the counterclockwise direction, whereby locking pawl 18 is urged in the clockwise direction by means of pin 17 to disengage from a circumferential tooth 10 of internal gear 9 and release the internal gear. Since the motor 1 is still rotating, the drive force of sun gear 4 is transmitted to planet gear 8, but internal gear 9 remains stopped due to a force of friction of internal gear 9 relative to film winding gear 12 as well as a force of inertia. The drive force accordingly is not transmitted until the planet gear 8 revolves around sun gear 4 and roller 7 engages the jaw portion 13a of lock lever 13. One cycle of operation of this device is terminated when roller 7 is again locked by shoulder portion 13c of lock lever 13 after termination of the winding of a film on the camera side.

As is apparent from the foregoing, the revolution of the planet gear around the sun gear is controlled by a mechanism simple in construction. Thus, reduction in cost, weight and size of a camera results.

What is claimed is:

1. A motor drive device for a camera comprising:
   a motor,
   a sun gear driven by said motor,
   driven means for providing an output film drive to the film winding members in a camera,
   an internal gear coupled to said driven means,
   a plant gear meshing with said sun gear and said internal gear, said planet gear being adapted to revolve around said sun gear, and
   locking means for elastically locking said planet gear when said internal gear is free to rotate so that said planet gear is prevented from revolving around said sun gear while permitted to rotate about its own axis and acts as a relay gear to transmit the drive force of said motor to said driven means.

2. A motor drive device as recited in claim 1 wherein said internal gear is prevented from rotating when the film winding operation in a camera coupled to said driven means is completed, said locking means then permitting said planet gear to rotate around said sun gear, said motor drive device further comprising:
   a locking pawl mechanism coupled to said planet gear through said locking means, the rotation of said planet gear around said sun gear causing said locking pawl mechanism to engage said internal gear, and
   a switch actuated on the engagement of said locking pawl mechanism with said internal gear, said switch being connected to said motor, the actuation of said switch stopping said motor so that shutter release in the camera may be effected.

3. A motor drive device as recited in claim 2 wherein effecting shutter release in the camera starts said motor with the result that said planet gear again rotates around said sun gear causing said locking pawl to disengage from said internal gear and de-actuates said switch, said planet gear continuing to rotate around said sun gear until again locked by said locking means.

4. A motor drive device as recited in claim 3 further comprising a roller rotatably mounted on a shaft concentrically attached to said planet gear, said locking means including a locking lever having a jaw portion for engagement with said roller to lock said planet gear.

5. A motor drive device as recited in claim 4 wherein said locking lever has a shoulder portion and a first cam surface between said jaw portion and said shoulder portion, said roller engaging said first cam surface after the film winding operation is completed and coming to rest in said shoulder portion when the actuation of said switch stops said motor.

6. A motor drive device device as recited in claim 5 further comprising a release lever engaged by said roller after said motor starts, said release lever being adapted to engage a release device in the camera.

* * * * *